(12) United States Patent
Xu et al.

(10) Patent No.: US 8,772,386 B2
(45) Date of Patent: Jul. 8, 2014

(54) COPOLYMER DISPERSION FOR WATER WHITENING RESISTANT COATINGS

(75) Inventors: Jianming Xu, Shanghai (CN); Tingke Zhang, Shanghai (CN); Hui Liu, Shanghai (CN)

(73) Assignee: Rohm and Haas Company, Philadelphia, PA (US)

( * ) Notice: Subject to any disclaimer, the term of this patent is extended or adjusted under 35 U.S.C. 154(b) by 101 days.

(21) Appl. No.: 13/448,565

(22) Filed: Apr. 17, 2012

(65) Prior Publication Data

US 2012/0264859 A1    Oct. 18, 2012

(30) Foreign Application Priority Data

Apr. 18, 2011  (CN) .......................... 2011 1 0114190

(51) Int. Cl.
   *C08K 5/16*       (2006.01)
   *C08G 59/50*      (2006.01)

(52) U.S. Cl.
   USPC .......................................... 524/186; 524/243

(58) Field of Classification Search
   USPC ....................................................... 524/186
   See application file for complete search history.

(56) References Cited

U.S. PATENT DOCUMENTS

| | | | |
|---|---|---|---|
| 4,325,856 A | 4/1982 | Ishikawa et al. | |
| 4,654,397 A | 3/1987 | Mueller-Mall et al. | |
| 4,814,373 A | 3/1989 | Frankel et al. | |
| 5,286,843 A | 2/1994 | Wood | |
| 5,939,482 A * | 8/1999 | Kriessmann et al. | 524/460 |
| 6,242,515 B1 | 6/2001 | Zhao et al. | |

FOREIGN PATENT DOCUMENTS

| | | | |
|---|---|---|---|
| EP | 0694564 A1 | 1/1996 | |
| EP | 0778317 A2 | 6/1997 | |
| JP | 07026194 A | 1/1995 | |
| JP | 7062191 A | 3/1995 | |
| JP | 07062191 A * | 3/1995 | ............. C08L 51/00 |
| JP | 09124996 A * | 5/1997 | ........... C09D 133/14 |
| JP | 9124996 A | 5/1997 | |
| JP | 2003226793 A | 8/2003 | |
| JP | 2007277402 A | 10/2007 | |
| WO | 9509209 A1 | 4/1995 | |
| WO | WO 9509209 A1 * | 4/1995 | ........... C09D 133/08 |

OTHER PUBLICATIONS

Database WPI Week 199610, Thomson Scientific, London, GB; AN 1996-094454 XP 002680923 & JP 8 003510 A (Nippon Zeon KK), Jan. 9, 1996, Abstract.
European Search Report issued in EP 12 16 0686, dated Aug. 7, 2012.

* cited by examiner

*Primary Examiner* — Hui Chin
(74) *Attorney, Agent, or Firm* — Karl E. Stauss; Cantor Colburn

(57) ABSTRACT

The present invention provides an aqueous copolymer dispersion comprising a copolymer and a polyamine, the copolymer comprises, as copolymerized units, at least one nonionic monomer selected from (meth)acrylate $C_6$-$C_{22}$ alkyl ester or Versatic vinyl ester; wherein the amount of the nonionic monomer ranges from 15% to less than 50% and wherein the amount of the polyamine ranges from 0.1 to 2%, by dry weight percentage based on the dry weight of the copolymer. The copolymer dispersion is suitable for use in coating compositions such as stone paints with significant improvement of water whitening resistance.

12 Claims, No Drawings

COPOLYMER DISPERSION FOR WATER WHITENING RESISTANT COATINGS

BACKGROUND

This invention relates generally to aqueous copolymer dispersions for used in stone paint or in other architectural exterior or interior coatings which needs superior water whitening resistance.

Water whitening resistance is required in many architectural coatings. Normally, when an aqueous latex emulsion dries, the latex particles are coalesced to form a film. Other components in the coating, such as surfactant, initiator, buffer, coalescent and preservative, which may be ionically-charged and water-soluble, are trapped in the interstitial areas of the film. These components are prone to attract water due to their hydrophilic chemical nature which endows the film a driving force by which the water can easily migrate from the film surface into the interstitial areas and thus cause the water-whitening problem.

The water whitening resistance of latex compositions can be improved by removing hydrophilic components, introducing special monomers into the polymer latex, or crosslinking the polymer latex. But these methods are still not ideal in process simplicity, cost effectiveness and performance balance.

Polyamine is used as an additive in acrylic copolymer dispersions for aqueous coating compositions. JP7026194A provides a water-borne dispersion for coating with improved adhesion to the substrate, hardness and stain-proof properties by formulating an acrylic copolymer (A) having −20° C. or higher glass transition temperature with a polyamine additive (B) at 0.05 to 40 (B)/100 (A) weight ratio. The monomers of (a) 0.1 to 40 wt % of an ethylenically unsaturated carboxylic acid; (b) 50 to 99.9 wt % of an alkyl(meth)acrylate; and (c) 0 to 49.9 wt % (where (a)+(b)+(c)=100 wt %) of other copolymerizable monomers are subjected to copolymerization to prepare copolymer (A). The water-borne dispersion shows good water resistance in performance evaluation. However, the water whitening resistance property of the dispersions are not mentioned in the reference. The inventors surprisingly found that, by adjusting the formulation copolymer composition and the content of the copolymer and the polyamine additive, the water whitening resistance performance of the dry coating film derived therefrom can be obviously improved.

Therefore, the problem addressed by this invention is to find copolymer dispersions for the application in coatings which show higher level of water whitening resistance of the dry coating film therefrom.

STATEMENT OF INVENTION

The present invention is directed to an aqueous copolymer dispersion comprising a copolymer and a polyamine, the copolymer comprises, as copolymerized units, at least one nonionic monomer selected from (meth)acrylate $C_6$-$C_{22}$ alkyl ester or Versatic vinyl ester; wherein the amount of the nonionic monomer ranges from 15% to less than 50% and wherein the amount of the polyamine ranges from 0.1 to 2%, by dry weight percentage based on the dry weight of the copolymer.

DETAILED DESCRIPTION

For the purpose of describing the components in the compositions or copolymers of this invention, all phrases comprising parenthesis denote either or both of the included parenthetical matter and its absence. For example, the phrase "(meth)acrylate" means acrylate, methacrylate, and mixtures thereof.

The aqueous copolymer dispersion essentially comprises at least one copolymer and at least one polyamine. The amount of the polyamine ranges from 0.1 to 2%, by dry weight percentage based on the dry weight of the copolymer.

As used herein, the term "wt %" shall mean percent by weight. Unless otherwise indicated, shall mean by dry weight percentage based on the total dry weight of the copolymer dispersion. The copolymer comprises, as copolymerized units, at least one ethylenically unsaturated nonionic monomer a). By "nonionic monomer" herein refers to (meth)acrylate $C_6$-$C_{22}$ alkyl ester or Versatic vinyl ester monomer which does not bear an ionic charge between pH=1-14. Suitable nonionic monomer include (meth)acrylic esters such as, for example, 2-ethylhexyl(meth)acrylate, cyclohexyl(meth)acrylate, tetradecyl(meth)acrylate, oleyl(meth)acrylate, palmityl(meth)acrylate, stearyl(meth)acrylate, decyl(meth)acrylate, lauryl(meth)acrylate, and isodecyl(meth)acrylate; succinates such as, for example, dihexyl succinate and didecyl succinate; and versatic vinyl esters (Veova) such as, for example, Veova 8, Veova 9, Veova 10 and Veova 11. Preferably, the ethylenically unsaturated nonionic monomer is selected from the group consisting of 2-ethylhexyl(meth)acrylate, decyl(meth)acrylate, lauryl(meth)acrylate, isodecyl(meth)acrylate, Veova 8, Veova 9, Veova 10, Veova 11 and the combination thereof. More preferably the nonionic monomer is selected from the group consisting of 2-ethylhexyl(meth)acrylate, lauryl(meth)acrylate, Veova 9, Veova 10, Veova 11 and the combination thereof.

The amount of the nonionic monomer(s) in the copolymer ranges from 15 wt % to less than 50 wt %, preferably from 20 wt % to less than 50 wt %, more preferably from 30 wt % to less than 50 wt %. When the copolymer contains a high amount of nonionic residue, for example, equal to or higher than 50 wt %, or higher than 70 wt %, the dry coating film shows negative effects not only in water whitening resistance but also in other performances such as scrub resistance and tackiness, especially when more than 2 wt % polyamine is used in the composition.

The copolymer optionally comprises, as copolymerized units, up to 10 wt %, preferable from 2 wt % to 10 wt %, more preferably from 2 wt % to 8 wt %, a self-crosslinking monomer b). The "self-crosslinking monomer" herein refers to those monomers containing acetoacetoxy or acetoacetamide or N-hydroxylmethyl groups. Although some of the self-crosslinking monomers are nonionic, they are not deemed as above mentioned "nonionic monomer" category in the present invention. Suitable self-crosslinking monomers include hydroxylmethyl amide monomers such as, for example, N-hydroxylmethyl(meth)acrylamide; acetoacetoxy or acetoacetamide functional monomers such as, for example, acetoacetoxyethyl(meth)acrylate, acetoacetoxypropyl(meth)acrylate, acetoacetoxybutyl(meth)acrylate, and 2,3-di(acetoacetoxy)propyl(meth)acrylate; allyl acetoacetates; vinyl acetoacetates; and acetoacetamides of formula I

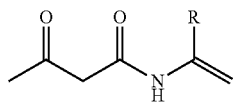

wherein R is either H or methyl. Preferred acetoacetoxy functional monomer is selected from the group consisting of acetoacetoxyethyl(meth)acrylate, acetoacetoxypropyl(meth)acrylate, allyl acetoacetate, acetoacetoxybutyl(meth)acrylate, 2,3-di(acetoacetoxy)propyl(meth)acrylate, and the composition thereof.

The addition of copolymerized self-crosslinking monomer is observed to improve water whitening resistance and other performances such as scrub resistance, dirt pick up resistance, hardness of the dry coating film.

The copolymer may further comprise, as copolymerized units, up to 3 wt %, preferably from 0.05 wt % to 1.5 wt %, more preferably from 0.1 wt % to 1 wt %, an ethylenically unsaturated monomer c) having at least one alkoxysilane functionality, preferable hydrolyzable alkoxysilane functionality. The alkoxysilane functionalized monomer includes, for example, vinyltrialkoxysilanes such as vinyltrimethoxysilane; alkylvinyldialkoxysilanes; (meth)acryloxyalkyltrialkoxysilanes such as (meth)acryloxyethyltrimethoxysilane and (meth)acryloxypropyltrimethoxysilane; and the derivatives thereof. The alkoxysilane functional monomer herein does not belong to above mentioned "nonionic monomer" category.

The alkoxysilane functionality monomer may be added during the copolymerization of the copolymer or after the copolymerization of at least one ethylenically unsaturated nonionic monomer and at least one alkoxysilane-capable precursor monomer. By "alkoxysilane-capable precursor monomer" herein refers to a monomer that has a reactive group capable of, after copolymerization, reacting with an alkoxysilane containing compound to yield an alkoxysilane-containing functional group attached to the copolymer, for example, a copolymer containing, as a copolymerized unit, an epoxy silane or an amino silane to form a silane containing copolymer.

The copolymer may further comprise, as copolymerized unit, up to 5 wt %, preferably from 0.5 wt % to 3 wt %, more preferably from 0.5 wt % to 2 wt %, at least one ethylenically unsaturated monomer d) carrying at least one functional group selected from carboxyl, carboxylic anhydride, hydroxyl and amide. Examples of this monomer category include ethylenically unsaturated carboxylic acids, especially (meth)acrylic acids; and dicarboxylic acids such as, for example, itaconic acid and maleic acid; and amides, especially N-alkylolamides or hydroxyalkyl esters of the above-mentioned carboxylic acids, such as (meth)acrylamide, N-methylol(meth)acrylamide, 2-hydroxyethyl(meth)acrylamide; hydroxyethyl(meth)acrylate and hydroxypropyl(meth)acrylate. Preferred is a carboxylic acid monomer. The amide monomers herein do not belong to above mentioned "nonionic monomer" category.

The summation of the monomers' percentage in the copolymer is 100%. When there is selective monomer in the copolymer, other monomers may reduce their scale by lower the upper limit. When there is selective nonionic self-crosslinking monomer, alkoxysilane functional monomer, or other monomer carrying at least one functional group selected from carboxyl, carboxylic anhydride, hydroxyl and amide, the total amount of alkyl(meth)acrylate in the composition should be less than 50 wt %.

The aqueous copolymer dispersion of the present invention comprises, as an additive, from 0.1 wt % to 2 wt %, preferably 0.3 wt % to 2 wt %, more preferably 0.5 wt % to 2 wt %, at least one polyamine having at least two amino groups. Suitable polyamine includes, for example, homopolymer or copolymer containing, as (co)polymerized units, vinylamines such as, for example, ethylenediamine, propylenediamine, tetramethylenediamine, pentamethylenediamine, hexamethylenediamine, diethylenetriamine, triethylenetetramine, tetraethylenepentamine, pentaethylenehexamine, polyethyleneimine and polypropyleneimine; ethylene oxide amine adducts, propylene oxide adducts, cyclohexane diamine, xylylene diamine, aminotrimethylcyclohexane amine, 2,2,4-trimethylhexane diamine, 2,2-dimethylpropane diamine, triaminononane, JEFF™ amines (Hunstmann, Salt Lake City, Utah, USA), N-(2-Aminoethyl)ethanolamine diaminomethylcyclohexane, and the composition thereof, trimethylene diamine, A 1,2-butylenediamine, Isobutylenediamine, diamine, N-ethylethylenediamine, N,N'-dimethylethylenediamine; 1,2-diaminocyclobutane, 1,3-diaminocyclohexane, N-ethyl-1,4-diaminocyclohexane; o-, m-phenylenediamine, 2,4-diaminotoluene, o-, m-aminomethyl aniline, N-phenylaminoethylamine, 3,9-bis(3-aminopropyl)-2,4,8,10-tetra oxo spiro[5,5]undecane; 3-azahexane-1,6-diamine, 4,7-diaza decane-1,10-diamine, iminobis propylamine; and the composition thereof.

In one embodiment of the present invention, the aqueous copolymer dispersion comprises from 75 to 99.9 wt % at least one copolymer and from 0.1 to 2 wt % at least one polyamine selected from the group consisting of ethanediamine, propane diamine, diethylene diamine, triethylenetetramine, diethylenetriamine, JEEF™ amines, N-(2-aminoethyl)ethanolamine and the composition thereof, the copolymer comprises, as copolymerized unit, a) from 20 wt % to less than 50 wt %, one or more nonionic monomers selected from the group consisting of 2-ethylhexyl (meth)acrylate, decyl(meth)acrylate, lauryl(meth)acrylate, isodecyl(meth)acrylate, Veova 8, Veova 9, Veova 10, Veova 11 and the composition thereof;

b) up to 10 wt %, one or more self-crosslinking monomers selected from the group consisting of N-hydroxylmethyl (meth)acrylamide, acetoacetoxyethyl(meth)acrylate, acetoacetoxypropyl(meth)acrylate, acetoacetoxybutyl(meth)acrylate, 2,3-di(acetoacetoxy)propyl(meth)acrylate; allyl acetoacetate; vinyl acetoacetate and the composition thereof;

c) from 0.5 wt % to 5 wt %, one or more monomers selected from the group consisting of methacrylic acid, itaconic acid, maleic acid, (meth)acrylamide and the composition thereof;

d) up to 3 wt %, a monomer having at least one alkoxysilane functionality, wherein the monomer is selected from vinyltrimethoxysilane, alkylvinyldialkoxysilane, (meth)acryloxyethyltrimethoxysilane, (meth)acryloxypropyltrimethoxysilane and the composition thereof.

Within the monomers mentioned above, any monomer that falls in category b), c) or d) does not fall in category a).

Sometimes, the copolymer may contain, by weight based on the dry weight of the copolymer, up to 5 wt %, preferably 0.5 wt % to 3 wt %, more preferably 1.0 wt % to 2.5 wt %, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene. Preferred is the use of no copolymerized multi-ethylenically unsaturated monomers.

The glass transition temperature (Tg) of the copolymer is from −35° C. to 60° C., preferably from −15° C. to 40° C., and more preferably from −10° C. to 30° C. Tgs used herein are those calculated by using the Fox equation (T. G. Fox, Bull. Am. Physics Soc., Volume 1, Issue No. 3, page 123 (1956)). That is, for calculating the Tg of a copolymer of monomers M1 and M2, $$\frac{1}{T_g(calc.)} = \frac{w(M)}{T_g(M_1)} + \frac{w(M_2)}{T_g(M_2)},$$

wherein Tg(calc.) is the glass transition temperature calculated for the copolymer, w(M1) is the weight fraction of monomer M1 in the copolymer, w(M2) is the weight fraction of monomer M2 in the copolymer, Tg(M1) is the glass transition temperature of the of M1, and Tg(M2) is the glass transition temperature of the of M2, all temperatures being in K. The glass transition temperatures of may be found, for example, in "Polymer Handbook", edited by J. Brandrup and E. H. Immergut, Interscience Publishers.

The polymerization techniques used to prepare the copolymer are well known in the art, for example an emulsion polymerization. In the emulsion polymerization process, conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 100° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period, or combinations thereof.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadine-sulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

Chain transfer agents such as, for example, halogen compounds such as tetrabromomethane; allyl compounds; or mercaptans such as alkyl thioglycolates, alkyl mercaptoalkanoates, and $C_4$-$C_{22}$ linear or branched alkyl mercaptans may be used to lower the molecular weight of the emulsion polymer and/or to provide a different molecular weight distribution than would otherwise have been obtained with any free-radical-generating initiator(s). Chain transfer agent(s) may be added in one or more additions or continuously, linearly or not, over most or all of the entire reaction period or during limited portion(s) of the reaction period such as, for example, in the kettle charge and in the reduction of residual monomer stage. Chain transfer agents are typically used in the amount of 0 to 5 wt %, based on the total weight of monomer used to form the aqueous copolymer dispersion. A preferred level of chain transfer agent is from 0.01 to 0.5, more preferably from 0.02 to 0.4 and most preferably from 0.05 to 0.2 mole %, based on the total number of moles of monomer used to form the aqueous copolymer dispersion.

In another embodiment of the present invention the aqueous emulsion polymer may be prepared by a multistage emulsion polymerization process, in which at least two stages differing in composition are polymerized in sequential fashion. Such a process sometimes results in the formation of at least two mutually incompatible polymer compositions, thereby resulting in the formation of at least two phases within the polymer particles. Such particles are composed of two or more phases of various geometries or morphologies such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation as detailed herein using the overall composition of the emulsion polymer without regard for the number of stages or phases therein. Similarly, for a multi-staged polymer particle the amount of the monomers shall be determined from the overall composition of the emulsion polymer without regard for the number of stages or phases therein. For example, the first stage composition primarily comprises of styrene and the second stage comprises of the composition described by this invention. Furthermore, the core of the copolymer particle may be hollow (i.e., air void). The polymerization techniques used to prepare such multistage emulsion polymers are well known in the art such as, for example, U.S. Pat. Nos. 4,325,856; 4,654,397; and 4,814,373. Preferably, the monomer b) is contained in only one step of the multistage emulsion polymerization.

The average particle diameter of the copolymer dispersion particles is from 50 to 350 nanometers, preferably from 50 to 300 nanometers, as measured by a BI-90 Particle Sizer.

The aqueous copolymer dispersion may also contain organic base and/or inorganic base as neutralizer. Suitable bases include ammonia, sodium hydroxide, potassium hydroxide, zinc oxide, mono-ethanolamine, triethyl amine, diethyl amine, dimethyl amine, sodium borate, potassium borate, aluminum hydroxide and the composition thereof.

The copolymer dispersion of the present invention optionally contains or may be formulated with pigment to prepare a coating composition. Examples of the pigment include, for example zinc oxide, antimony oxide, zirconium oxide, chromium oxide, iron oxide, lead oxide, zinc sulfide, lithopone, and titanium dioxide such as, for example, anatase and rutile titanium dioxide. It is also contemplated that the coating composition optionally contains opaque polymer particles, such as, for example, Ropaque™ opaque polymers (Rohm and Haas Co., Philadelphia, Pa., USA); and/or extenders including calcium carbonate, calcium sulfate, barium sulfate, mica, clay, calcined clay, feldspar, nepheline, syenite, wollastonite, diatomaceous earth, alumina silicates, aluminum oxide, silica, and talc; and/or colorants known in the art.

In one embodiment, the aqueous copolymer dispersion or the aqueous coating composition may have a pigment volume concentration (PVC) of from 30 to 90%, preferably of from 50 to 90%.

The aqueous coating composition made from the aqueous copolymer dispersion of this invention is contemplated to encompass coating or paint compositions which may be described in the art as low gloss or flat coatings, primers, textured coatings, and the like. The aqueous coating composition is prepared by techniques which are well known in the coatings art. First, optionally, at least one pigment is well dispersed in an aqueous medium under high shear such as is afforded by a COWLES mixer or, in an alternative, at least one predispersed pigment may be used. Then the aqueous copolymer dispersion is added under low shear stirring along with other coatings adjuvants, as desired. Alternatively, the aqueous copolymer dispersion may be included in the optional pigment dispersion step. The aqueous composition may contain conventional coatings adjuvants such as, for example, tackifiers, emulsifiers, coalescing agents such as for example, Texanol™ (Eastman Chemical Co.), cosolvents such as, for example, glycols and glycol ethers, buffers, neutralizers, thickeners or rheology modifiers, humectants, wetting agents, biocides, plasticizers, antifoaming agents, colorants, waxes, and anti-oxidants.

The solids content of the aqueous copolymer dispersion may be from about 10% to about 70% by volume. The viscosity of the aqueous copolymer dispersion may be from 0.05 to 10 Pa.s (50 cps to 10,000 cps), as measured using a Brookfield viscometer. The viscosities appropriate for different application methods vary considerably.

The aqueous copolymer dispersion or the coating composition therefrom may be applied by conventional application methods such as, for example, brushing, roller application, and spraying methods such as, for example, air-atomized spray, air-assisted spray, airless spray, high volume low pressure spray, and air-assisted airless spray.

The aqueous copolymer dispersion or the coating composition therefrom is suitable for being applied to a substrate such as, for example, plastic, wood, metal, primed surfaces, previously painted surfaces, stone, concrete, ceramic and cementitious substrates. The aqueous copolymer dispersion or the coating composition coated on the substrate is typically dried, or allowed to dry, at a temperature of from 1° C. to 95° C.

In the present specification, the technical features in each preferred technical solution and more preferred technical solution can be combined with each other to form new technical solutions unless indicated otherwise. For briefness, the Applicant omits the descriptions for these combinations. However, all the technical solutions obtained by combing these technical features should be deemed as being literally described in the present specification in an explicit manner.

EXAMPLES

I. Raw Materials

| A) Starting materials used in making dispersion | |
|---|---|
| Compound | Chemical Nature |
| BA | Butyl Acrylate |
| 2-EHA | 2-Ethylhexyl Acrylate |
| MMA | Methyl Methacrylate |
| (M)AA | (Meth)acrylic Acid |

| A) Starting materials used in making dispersion | |
|---|---|
| Compound | Chemical Nature |
| LMA | Lauryl Methacrylate |
| Veova 10 | vinyl ester of Versatic 10 |
| A-171 | Vinyl trimethoxysilane |
| AM | Acrylamide |
| APS | Ammonium persulfate |
| EDTA | Ethylenediaminetetraacetic acid |
| DBS | sodium dodecyl benzene sulfonate |
| MIT | 2-Methyl-4-isothiazolin-3-one |
| NXZ ™ | Deformer(Cognis) |
| AMP-95 | 2-methyl-2-amino-propanol |
| TETA | Triethylene tetramine |
| AEEA | HydroxyethyEthyleneDiamine |
| ED-600 | JEFF ™ amine ED-600 Polyetheramine |

II. Test Procedures

Water Whitening Resistance of Dry Coating Film on Vinyl Plate

10% coalescent Texanol (based on polymer dry wet) was added to the polymer dispersion and was stayed in room temperature overnight. Then a clear film (100 μm thickness) was made on vinyl sheet using the formulations. The coated substrate was allowed drying at room temperature for 24 hours. The film was dipped into deionized water for 8 hours and then water whitening result of the clear film was monitored by a colorimeter which measures ΔL value to evaluate the color development of the coated vinyl sheet. The whitening difference was finally described as ΔL=Mean(L1−L0). The L1 was the L value after water treatment and L0 was the L value before dipping into water. The threshold of ΔL was set around 2.5 which had acceptable water whitening resistance performance.

Water Whitening Resistance of Dry Coating Film on Glass Plate

The same procedure as above test method on vinyl plate, except that the substrate was changed to glass plate. The film was dipped in deionized water for 24 hours. The water whitening of the clear film was monitored in the form of visual observation ranking based on the average performance of repeated tests. The ranking results of Rank 1 to 5 are described in below table and Rank 3 was set as threshold.

| Rank | Whitening |
|---|---|
| 1 | No |
| 2 | slight |
| 3 | Moderate |
| 4 | Strong |
| 5 | Severe |

Example 1

An aqueous dispersion A was prepared by following process: A monomer emulsion was prepared by combining 615 g EHA, 836 g MMA, 22.7 g MAA, 7.48 g AM, 2.99 g A-171, 28.33 g 19% DBS solution, and 338.4 g DI water, and emulsified with stirring. Next, 12.58 g of a 19% by weight aqueous solution of DBS and 784 g DI water were charged to a five liter multi-neck flask fitted with mechanical stirring. The contents of the flask were heated to 90° C. under a nitrogen atmosphere. To the stirred flask, 4.5 g $Na_2CO_3$ in 16 g DI water and 59 g of the monomer emulsion were added, followed by 3.04 g APS in 16 g DI water. The remaining monomer emulsion and a solution of 1.36 g APS in 170 g DI water and 172 g DI water were then added to the flask over 60 minutes. Reactor temperature was maintained at 88° C. Next, 26 g DI water was used to rinse the emulsion feed line to the reactor. After cooling the contents of the reactor to 70° C., 15.3 mg ferrous sulfate in 5 g water, 15.3 mg EDTA in 5 g water, 1.04 g t-butyl hydroperoxide (70% aq.) in 20 g water, and 0.58 g isoascorbic acid in 20 g water were added to the flask. Cooling the reactor temperature to 50° C. The contents of the flask were neutralized to a pH of 8.0 using 7.48 g Triethylene Tetramine (TETA) when the temperature cool to 50° C. 3.48 g MIT in 17.4 g DI water was added to the flask followed by 0.22 g NXZ™ (Cognis). The calculated Tg of the copolymer was 25° C. The resulting aqueous polymer dispersion A which had 46.8% solids was subjected to water whitening resistance tests.

Example 2

In a similar procedure to aqueous polymer dispersion A (Example 1), an aqueous polymer dispersion B was prepared using neutralizer 7.48 g AMP-95. The resulting Dispersion B had 46.7 wt % solids.

Example 3

In a similar procedure to aqueous polymer dispersion A (Example 1), an aqueous polymer dispersion C was prepared using neutralizer 3.74 g TETA and 3.74 g AEEA. The resulting Dispersion C had 46.8 wt % solids.

Example 4

In a similar procedure to aqueous polymer dispersion A (Example 1), an aqueous polymer dispersion D was prepared from a monomer mixture containing 2-EHA 165.21 g, LMA 450.58 g, MAA 22.67 g, AM 7.48 g, MMA 851.40 g, and A-171 2.99 g. The latex was neutralized by 7.48 g TETA. The resulting Dispersion D had 46.8 wt % solids.

Example 5

In a similar procedure to aqueous polymer dispersion A (Example 1), an aqueous polymer dispersion E was prepared from a monomer mixture containing 2-EHA 225.3 g, BA, 149.9 g, Veova 10 448.8 g, MAA 22.67 g, AM 7.48 g, MMA 641.56 g, and A-171 2.99 g. The latex was neutralized by 7.48 g TETA. The resulting Dispersion E had 47.1 wt % solids.

Example 6

In a similar procedure to aqueous polymer dispersion A (Example 1), an aqueous polymer dispersion F was prepared from a monomer mixture containing 2-EHA 225.3 g, BA, 465.62 g, MAA 22.67 g, AM 7.48 g, MMA 776.48 g, and A-171 2.99 g. The latex was neutralized by 7.48 g TETA. The resulting Dispersion F had 47.0 wt % solids.

Example 7

In a similar procedure to aqueous polymer dispersion A (Example 1), an aqueous polymer dispersion G was prepared from a monomer mixture containing 2-EHA 751 g, MAA 22.67 g, AM 7.48 g, MMA 716.52 g, and A-171 2.99 g. The latex was neutralized by 7.48 g TETA. The resulting Dispersion G had 46.9 wt % solids.

Example 8

In a similar procedure to aqueous polymer dispersion A (Example 1), an aqueous polymer dispersion H was prepared using neutralizer 1.496 g TETA. The resulting Dispersion H had 46.9 wt % solids.

Example 9

In a similar procedure to aqueous polymer dispersion A (Example 1), an aqueous polymer dispersion I was prepared using neutralizer 7.48 g AEEA. The resulting Dispersion I had 46.8 wt % solids.

Example 10

In a similar procedure to aqueous polymer dispersion A (Example 1), an aqueous polymer dispersion J was prepared using neutralizer 29.92 g ED-600. The resulting Dispersion J had 47.2 wt % solids.

Example 11

In a similar procedure to aqueous polymer dispersion A (Example 1), an aqueous polymer dispersion K was prepared from a monomer mixture containing 2-EHA 766.02, AM 7.48 g, MAA 22.67 g, MMA 701.53 g, and A-171 2.99 g. Then the latex was neutralized by 104.72 g TETA. The resulting Dispersion K had 48.6 wt % solids.

Example 12

In a similar procedure to aqueous polymer dispersion A (Example 1), an aqueous polymer dispersion L was prepared from a monomer mixture containing 2-EHA 150.2, MAA 22.67 g, AM 7.48 g, BA 555.74 g, MMA 761.49 g, and A-171 2.99 g. Then the latex was neutralized by 74.8 g TETA. The resulting Dispersion L had 48.2 wt % solids.

TABLE 1

Water whitening resistance evaluation results

| Sample | Polymer Formulation (wt %) | Polyamine (wt %) | ΔL | Rank |
|---|---|---|---|---|
| Dispersion A | 41EHA/56.8MMA/1.5MAA/0.5AM/0.2A-171 | 0.5% TETA | 0.49 | 1 |
| Dispersion B | Same as Dispersion A | 0.5% AMP-95 | 2.18 | 3 |
| Dispersion C | Same as Dispersion A | 0.25% TETA + 0.25% AEEA | 0.49 | 1 |
| Dispersion D | 30LMA/11EHA/56.8MMA/1.5MAA/0.5AM/0.2A-171 | 0.5% TETA | 0.7 | 1 |
| Dispersion E | 15EHA/42.8MMA/10BA/30Veova 10/1.5MAA/0.5AM/0.2A-171 | 0.5% TETA | 0.4 | 1 |
| Dispersion F | 15EHA/51.8MMA/31BA/1.5MAA/0.5AM/0.2A-171 | 0.5% TETA | 2.51 | 3 |
| Dispersion G | 49EHA/47.8MMA/1.5MAA/0.5AM/0.2A-171 | 0.5% TETA | 1.28 | 2 |
| Dispersion H | Same as Dispersion A | 0.1% TETA | 1.01 | 2 |
| Dispersion I | Same as Dispersion A | 0.5% AEEA | 0.81 | 1 |
| Dispersion J | Same as Dispersion A | 2% ED-600 | 1.35 | 2 |
| Dispersion K[#] | 51EHA/46.8MMA/1.5MAA/0.5AM/0.2A-171 | 7% TETA | 16.47 | 5 |
| Dispersion L[*] | 10EHA/50.8MMA/37BA/1.5MAA/0.5AM/0.2A-171 | 5% TETA | 19.48 | 5 |

[#]JP7026194A Comparative Example 6.
[*]JP7026194A Example 2.

The invention claimed is:

1. An aqueous copolymer dispersion comprising a copolymer and a polyamine, the copolymer comprising, as copolymerized units, at least one nonionic monomer selected from $C_6$-$C_{22}$ alkyl esters of (meth)acrylic acid and vinyl esters of $C_9$-$C_{11}$ tertiary-alkanoic acids; and
   0.05 to 3 wt % of a monomer having at lease one alkoxysilane functionality;
   wherein the amount of the nonionic monomer ranges from 15 wt % to less than 50 wt % and wherein the amount of the polyamine ranges from 0.1 to 2 wt %, by dry weight percentage based on the total dry weight of the copolymer dispersion; and
   wherein all monomer percentage are based on the dry weight of the copolymer.

2. The aqueous copolymer dispersion according to claim 1, wherein the amount of the nonionic monomer in the copolymer ranges from 20 wt % to less than 50 wt %.

3. The aqueous copolymer dispersion according to claim 1, wherein the nonionic acrylic monomer is selected from the group consisting of 2-ethylhexyl (meth)acrylate, lauryl (meth)acrylate, vinyl ester of tert-nonanoic acid, vinyl ester of tert-decanoic acid, vinyl ester of tert-undecanoic acid, and mixtures thereof.

4. The aqueous copolymer dispersion according to claim 1, wherein the copolymer further comprises, as copolymerized units, 2 to 10 wt % of a self-crosslinking monomer.

5. The aqueous copolymer dispersion according to claim 1, wherein the copolymer comprises, as copolymerized units, 0.05 to 1.5 wt % of the monomer having at least one alkoxysilane functionality.

6. The aqueous copolymer dispersion according to claim 1, wherein the copolymer comprises, as copolymerized units, 0.5 to 3.0 wt % of a monomer carrying at least one functional group selected from carboxyl, carboxylic anhydride, hydroxyl, amide, and mixtures thereof.

7. The aqueous copolymer dispersion according to claim 1, wherein the amount of the copolymer in the copolymer dispersion ranges from 98 to 99.9 wt %, based on the total dry weight of the copolymer dispersion.

8. The aqueous copolymer dispersion according to claim 1, wherein the amount of the polyamine ranges from 0.5 to 2 wt %, by dry weight based on the total dry weight of the copolymer dispersion.

9. The aqueous copolymer dispersion according to claim 1, wherein the polyamine is selected from the group consisting of ethanediamine, propane diamine, diethylene diamine, triethylenetetramine, diethylenetriamine, polyetheramines, N-(2-aminoethyl)ethanolamine and mixtures thereof.

10. An aqueous coating composition comprising the aqueous copolymer dispersion of claim 1.

11. The aqueous copolymer dispersion according to claim 4, wherein the self-crosslinking monomer comprises an acetoacetoxy group, an acetoacetamide group, or a N-hydroxylmethyl group.

12. The aqueous copolymer dispersion according to claim 1, wherein monomers comprising an acetoacetoxy group, an acetoacetamide group, or an N-hydroxylmethyl group are all excluded from the copolymer.

* * * * *